United States Patent [19]
Tantlinger

[11] 3,886,869
[45] June 3, 1975

[54] THRUST RESPONSIVE PINCH WHEEL DRIVE MECHANISM

[75] Inventor: Keith W. Tantlinger, Coronado, Calif.

[73] Assignee: Rohr Industries Inc., Chula Vista, Calif.

[22] Filed: June 5, 1974

[21] Appl. No.: 476,735

[52] U.S. Cl............ 104/147 R; 104/23 FS; 105/30; 105/73
[51] Int. Cl............................................ B61b 13/12
[58] Field of Search ..... 104/147 R, 148 R, 148 MS, 104/23 FS; 105/30, 49, 73, 141

[56] References Cited
UNITED STATES PATENTS

| | | | |
|---|---|---|---|
| 3,241,498 | 3/1966 | Temple................................. | 105/73 |
| 3,675,583 | 7/1972 | Sobey et al. ...................... | 105/30 X |
| 3,727,560 | 4/1973 | Blemly............................. | 105/30 X |

Primary Examiner—M. Henson Wood, Jr.
Assistant Examiner—John J. Love

[57] ABSTRACT

A pair of power driven pinch wheels, in tractive engagement with oppositely facing reaction surfaces of a track element for driving and braking a track guided vehicle are mounted on a pair of lever arms which in turn are mounted on a sub-frame which is longitudinally movable relative to a main frame of the vehicle. The pinch wheels are pre-biased into at least lightly pressurized engagement with the track element, and any change in tractive effort by the pinch wheel sub-frame relative to the vehicle main frame actuates a hydraulic cylinder which is operatively connected to pressure responsive means. The latter is operatively connected to the pinch wheel arms in a manner to vary the pressure of the pinch wheels on the track element directly with variations in pressure generated by actuation of the hydraulic cylinder.

11 Claims, 6 Drawing Figures

3,886,869

THRUST RESPONSIVE PINCH WHEEL DRIVE MECHANISM

BACKGROUND OF THE INVENTION

Heretofore various types of pinch wheel drive mechanisms have been developed for track mounted vehicles, and at least some of these prior mechanisms have been capable of varying the pressure of the pinch wheels on a track element in response to variations in driving and braking torque applied to the pinch wheels. Examples of such prior mechanisms are disclosed in U.S. Pat. Nos. 3,241,498 and 3,675,583. The present invention, while directed toward the same general end result as such prior mechanisms, is structurally quite different and is based on a different concept.

SUMMARY OF THE INVENTION

A primary objective of the present invention is to provide improved pinch wheel control mechanism wherein the pressure of a pair of pinch wheels against oppositely facing surfaces of a track element is controlled by thrust which is generated by driving and braking torque applied to the pinch wheels, such thrust being used to generate hydraulic pressure which is applied through pressure responsive means to vary the pressure of the pinch wheels on the track element.

DESCRIPTION OF THE DRAWINGS

The objectives and advantages of the invention will be apparent from the following description and the accompanying drawings wherein.

DETAILED DESCRIPTION

Figure 1:
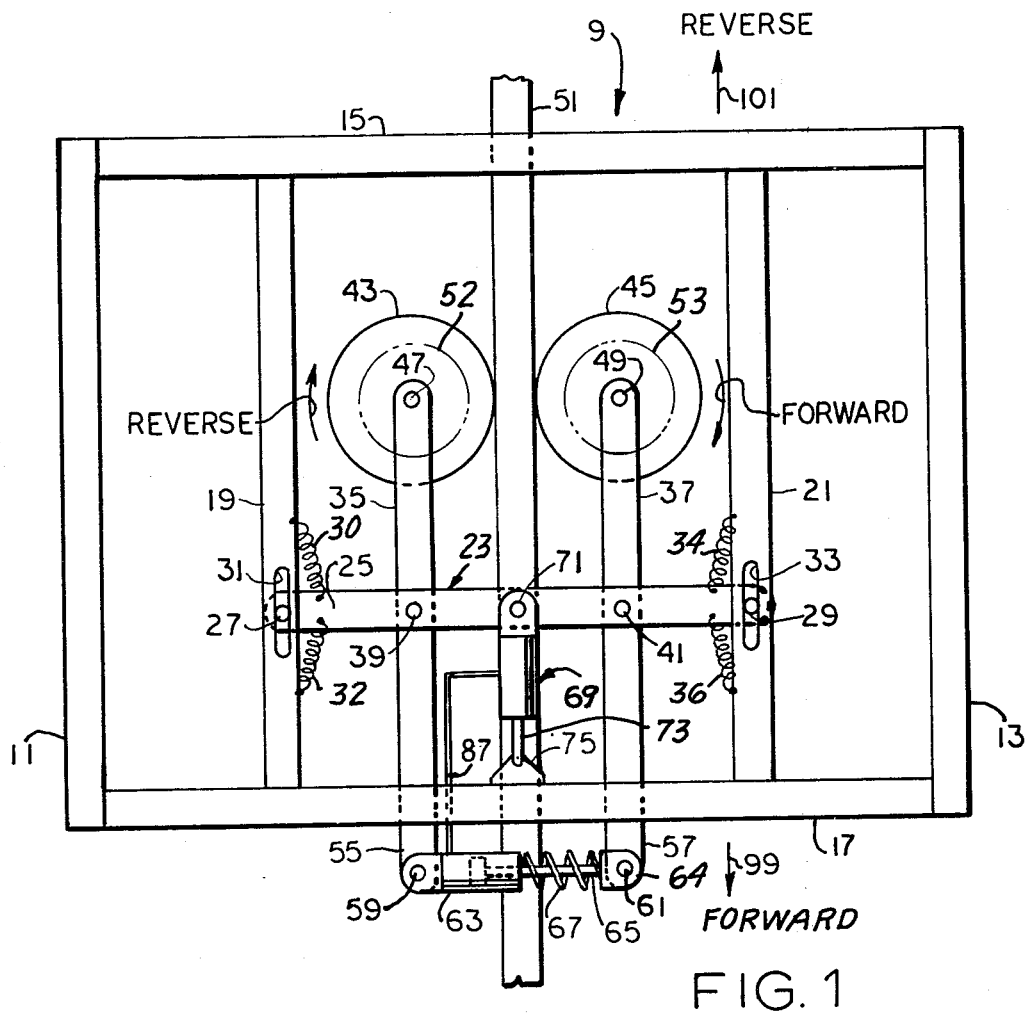
FIG. 1 is a fragmentary, diagrammatic, plan view illustrating principal features of the invention.

Referring to the drawings in detail, a track guided vehicle, not otherwise shown, comprises a rectangular vehicle frame 9 with side members 11 and 13, end members 15 and 17, and a pair of parallel guide and support members 9 and 21 for supporting a pinch wheel subframe 23 for limited movement longitudinally of the vehicle. The near end of the vehicle frame 9 as shown in FIG. 1 is assumed to be the forward end of the vehicle.

The pinch wheel sub-frame 23 comprises a cross member 25 substantially parallel to the structural end members 15 and 17 and slidably connected to the frame members 19 and 21 by pins 27 and 29, respectively, riding in slots 31 and 33 provided in the guide and support members 19 and 21. Spring means 30, 32, 34, and 36 may be provided to urge the sub-frame 23 toward centered position.

A pair of pinch wheel support arms 35 and 37 are pivotally connected intermediately of their ends by pins 39 and 41, respectively, to the sub-frame cross member 25, and pinch wheels 43 and 45 are mounted on shafts 47 and 49, respectively, journaled in the rearward ends of the pinch wheel support arms to bear against oppositely facing surfaces of a track element 51.

Figure 4:
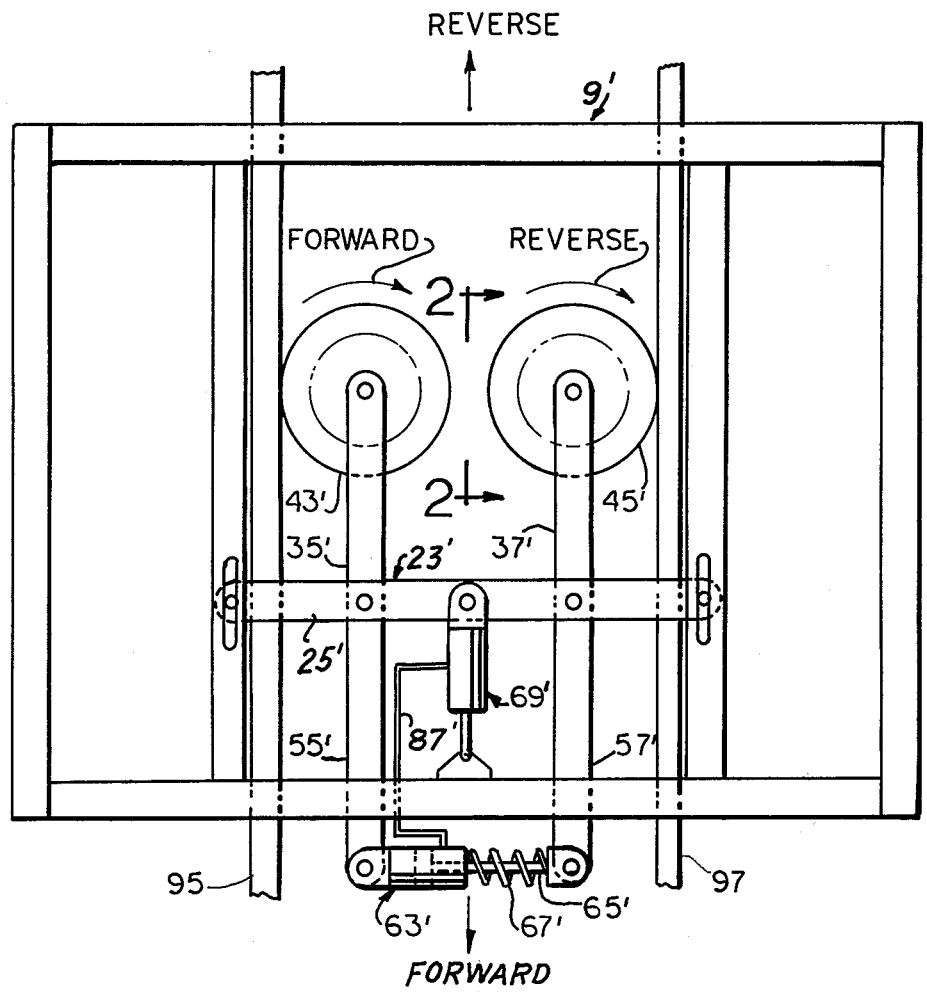
FIG. 4 is a fragmentary, diagrammatic plan view illustrating a modified form of the invention.
Figure 5:
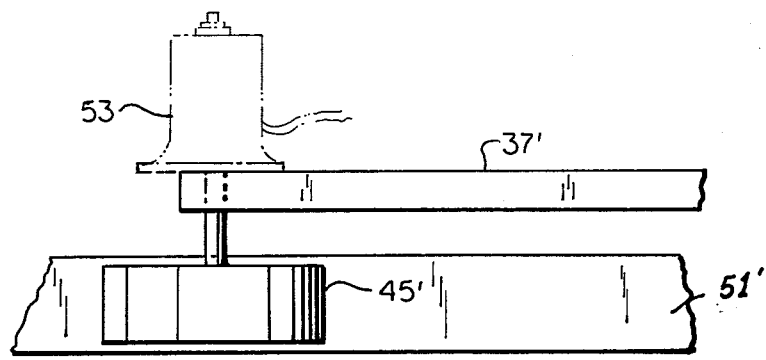
FIG. 5 is a diagrammatic view illustrating power drive means for applying accelerating and decelerating torque to the pinch wheels.

Suitable or conventional power drive and braking means is provided for the pinch wheels 43 and 45 as represented diagrammatically in FIGS. 1, 4 and 5 by a conventional, reversible electric propulsion motors 52 and 53, mounted one on each pinch wheel support arm 35 and 37 and in driving connection with the shafts of the pinch wheels 43 and 45, respectively. Various types of power drive and braking means for pinch wheels are well known, and since such means is not, per se, a feature of this invention, further details thereof are omitted.

The forward ends 55 and 57, see FIG. 1, of the pinch wheel support arms are pre-loaded toward separation by suitable pre-loading means, which, as illustrated in FIG. 1, comprises a coil spring 67 encircling the piston rod 65 of a pressure responsive hydraulic cylinder 63 and held in compression between the cylinder 63 and a clevis end fitting 64 of the piston rod 65.

For controlling the pressure exerted by the pinch wheels 43 and 45 against oppositely facing sides of the track element 51 proportionally to the torque applied to the pinch wheels, a pressure generating hydraulic cylinder 69 is pivotally connected by a pin 71 to the mid-point of the pinch wheel frame member 25, and the piston rod 73 of this cylinder is anchored to the vehicle frame end member 17 by a tab 75.

Figure 2:
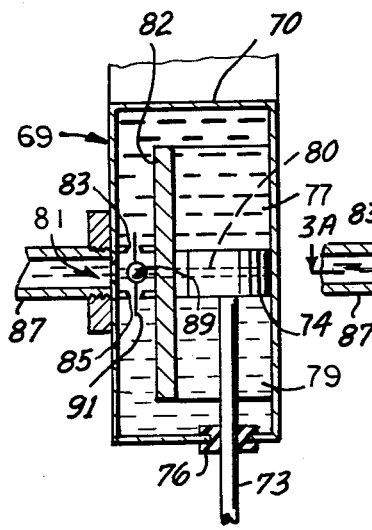
FIG. 2 is an enlarged, diagrammatic view in the nature of a diametrical sectional view of the pressure generating hydraulic cylinder and its valve as it appears with the vehicle on which it is mounted either in static or coasting mode.
Figure 3:
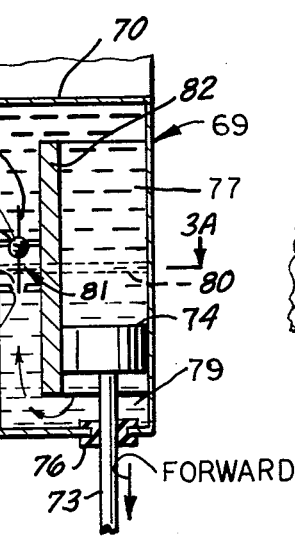
FIG. 3A is a sectional view taken along line 3A — 3A of FIG. 3.
Figure 3A:
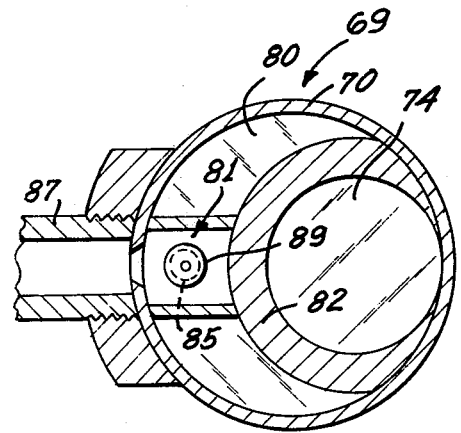

The pressure generating cylinder 69 may be of any suitable or well known type, and as shown in FIGS. 2 and 3 comprises a cylindrical casing 70 closed and sealed at both ends except for a hole for mounting a piston rod 73 for axial movement therein. A gland 76, see FIGS. 2 and 3, is mounted in this hole to seal the piston rod to the casing. An inner cylinder 82, open at both ends, is mounted in axially parallel relation within the casing 70, and is integrally joined thereto. A piston 74, to which the piston rod 73 is co-axially connected, is sealed for axial movement in the inner cylinder 82. The crescent shaped space between the casing 70 and the inner cylinder 82, best shown in FIG. 1A, is sealed by a partition 80, thus dividing the interior of the casing 70 into two chambers 77 and 79. A valve 81 is mounted in an opening provided therefor in the partition 80, and this valve has two ports 83 and 85 which communicate with chambers 77 and 79, respectively, and a third port which communicates through a hydraulic hose 87 with the pressure responsive cylinder 63. A valve ball 89 having a guide pin 91 inserted diametrically therethrough is mounted to seat selectively in the ports 83 and 85. The guide pin guides the ball between the two ports 83 and 85 upon reversal of pressure between the chambers 77 and 79, and prevents the ball from seating in the outlet to the hydraulic hose 87.

OPERATION OF THE MECHANISM OF FIGS. 1-3

Assuming that a vehicle embodying the form of the invention shown in FIGS. 1, 2, 3 and 3A embodied therein is at rest on a level stretch of track. In this condition, the two chambers 77 and 79 of the pressure generating cylinder 69 are at equal pressure, and the pinch wheels 43 and 45 are subject to only the biasing force of the pre-loading spring 67. In this condition, the centering springs 30–34 urge the pinch wheel frame 23 toward centered position in the slots 31 and 33. Upon the application of forward driving torque to the pinch wheels by their power drive means motor 53, the sub-frame 23 is urged forwardly toward the position of FIG. 3 to increase the pressure in chamber 79, and seat the valve ball 91 in port 83. The increased hydraulic pressure is transmitted through the hose 87 and into the pressure responsive cylinder 63, thereby urging the forward ends 55 and 57 of the lever arms 35 and 37 apart to increase the pressure of the pinch wheels 43 and 45 on the track element 51.

Reduction of the forward driving torque on the pinch wheels reduces the forward thrust on the sub-frame 23 relative to the vehicle frame 9 and thereby reduces the hydraulic pressure within the cylinder 63 and the pressure of the pinch wheels on the track element. The application of decelerating or braking torque to the pinch wheels during forward movement of the vehicle, or while at rest on an inclined track, or reversing torque applied while the vehicle is at rest, causes in each case relative rearward movement of the sub-frame 23, thereby increasing the pressure in the chamber 77 and causing the valve 81 to seal in port 85 to again increase the pressure within the pressure responsive cylinder 63 and increase the pressure of the pinch wheels on the track element.

The modified form of the invention shown in FIG. 4 is generally similar to that of FIG. 1, and corresponding parts thereof are designated by the same reference numerals as those of FIG. 1 with the prime (') added.

The spring 67' of FIG. 4 is in tension rather than in compression as in FIG. 1, the hydraulic hose 87' is connected to the other end of cylinder 63' than in FIG. 1, and two parallel track elements 95 and 97, which may be opposite side flanges of a channel member, replace the single track element 51 of FIG. 1, with the pinch wheels bearing against the inner surfaces of these two track elements rather than against opposite sides of the single track element 51 of FIG. 1.

With this information, the operation of the modified form of the invention shown in FIG. 4 will be apparent to one familiar with the art in view of the foregoing description of FIGS. 1–4.

The invention provides a pinch wheel drive mechanism which is instantly and proportionally responsive to changes in tractive forces applied to the pinch wheels to vary the pressure of the pinch wheels normal to the bearing surfaces of their respective reaction track elements.

Having thus described my invention what I claim as new and useful and desire to secure by U.S. Letters Patent is:

1. Pinch wheel drive mechanism for a track guided vehicle mounted on a track having oppositely facing reaction surfaces thereon, said mechanism comprising:
   pinch wheel support means mounted on the vehicle for limited movement relative thereto,
   a pair of pinch wheels journaled on the support means and movable toward and away from each other, said pinch wheels being in rolling engagement with such oppositely facing track reaction surfaces,
   power drive means operatively connected to apply driving torque to at least one of the pinch wheels and thereby urge the pinch wheel support means in a selected direction,
   hydraulic pressure generating means operatively interposed between the vehicle and the pinch wheel support means for actuation by movement of the pinch wheel support means relative to the vehicle, and
   hydraulic pressure responsive means openly communicating with the pressure generating means and operatively connected to the pinch wheels to urge the pinch wheels toward increased gripping engagement with their respective reaction surfaces upon an increase of hydraulic pressure transmitted from the pressure generating means to the pressure responsive means.

2. Pinch wheel drive mechanism as defined in claim 1 wherein the pinch wheels are mounted on a pair of pivotally mounted lever arms, and the hydraulic pressure responsive means is mounted, upon actuation thereof by the hydraulic cylinder, to move the lever arms in opposite rotative directions about their respective pivotal mountings.

3. Pinch wheel drive mechanism as claimed in claim 1 wherein spring means urges the pinch wheel support means toward a selected position relative to the vehicle.

4. Pinch wheel drive mechanism as claimed in claim 2 wherein the hydraulic pressure generating means comprises a cylinder sealed at both ends, a piston mounted in sealed relation within, and intermediately of the ends of the cylinder, a piston rod connected to the piston and extending in sealed relation through a gland provided in one end of the cylinder, pressure responsive means operatively connected to the pinch wheels to urge the pinch wheels toward their respective tractive surfaces upon an increase in pressure in the pressure responsive means, conduit means extending from each end of the cylinder to the pressure responsive means, and valve means mounted to open communication through the conduit means from the higher pressure end of the cylinder to the pressure responsive means, and substantially simultaneously to cut off communication from the lower pressure end of the cylinder to the pressure responsive means, upon a pressure increasing movement of the piston toward either end of the cylinder.

5. Pinch wheel drive mechanism as claimed in claim 4 wherein the pinch wheel support means is mounted for movement longitudinally of the vehicle, and the hydraulic cylinder and its piston extend axially longitudinally of the vehicle and are operatively connected, one to the pinch wheel support means and one to the vehicle frame.

6. Pinch wheel drive mechanism as claimed in claim 4 wherein the hydraulic responsive means also comprises a cylinder sealed at both ends, a piston sealed for axial movement therein, and a piston rod connected to the piston and extending in sealed relation through one end of the cylinder, the piston and its piston rod extending transversely between the lever arms with the cylinder operatively connected to one of the lever arms and the piston rod operatively connected to the other lever arm.

7. Pinch wheel drive mechanism comprising, in combination with a vehicle mounted on a track having a pair of oppositely facing reaction surfaces thereon:
   a vehicle frame incorporated in the vehicle,
   a sub-frame mounted for limited movement relative to the vehicle frame,
   a pair of pinch wheels journaled on the sub-frame and movable toward and away from each other, each pinch wheel being in rolling, tractive engagement with one of the oppositely facing track reaction surfaces, power drive means for applying to the pinch wheels propulsion torque in a selected direction, thereby urging the sub-frame in a selected direction relative to the vehicle frame, hydraulic pressure generating means operatively interposed between the vehicle frame and the subframe for actuation by movement of the sub-frame relative to the vehicle frame, hydraulic pressure responsive means operatively connected to the pinch wheels to increase pressure of the pinch wheels on their respective track element surface upon an increase of pressure transmitted to the pressure responsive means, and means operatively interconnecting the pressure generating means and the pressure responsive means to transmit pressure generated by the pressure generating means to the pressure responsive means.

8. Pinch wheel drive mechanism as claimed in claim 7 wherein the vehicle frame comprises a pair of parallel guide and support members extending longitudinally of the vehicle, the subframe comprises a cross member extending transversely of the guide and support members and connected thereto for limited movement longitudinally of the vehicle, a pair of pinch wheel support arms are pivotally mounted intermediately of their ends on the subframe cross member, the pinch wheels are mounted laterally opposite each other, one on an end of each support arm, and the support arms are preloaded to urge the pinch wheels into rolling engagement with their respective track reaction surfaces.

9. Pinch wheel drive mechanism as claimed in claim 7 wherein the pressure generating means comprises a hydraulic cylinder sealed at both ends, a piston is sealed for axial movement in the cylinder, a piston rod is connected to the piston and extends in sealed relation through a gland in one end of the cylinder, the cylinder, its piston and piston rod extend longitudinally of the vehicle, and means pivotally connect the cylinder and piston rod, one to the vehicle frame, and one to the mid-point of the cross member.

10. Pinch wheel drive mechanism as claimed in claim 7 wherein the pinch wheels are located laterally exteriorly of the track reaction surfaces.

11. Pinch wheel drive mechanism as claimed in claim 7 wherein the track reaction surfaces are separated laterally and the pinch wheels are mounted therebetween.

* * * * *